(12) United States Patent
Woehrle

(10) Patent No.: US 7,994,796 B2
(45) Date of Patent: Aug. 9, 2011

(54) CIRCUIT ARRANGEMENT AND METHOD FOR MONITORING THE FUNCTION OF A VIBRATION LEVEL SWITCH AND/OR A FILL LEVEL MEASURING APPARAUTUS

(75) Inventor: Siegbert Woehrle, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 604 days.

(21) Appl. No.: 11/698,019

(22) Filed: Jan. 26, 2007

(65) Prior Publication Data

US 2007/0205772 A1    Sep. 6, 2007

Related U.S. Application Data

(60) Provisional application No. 60/777,566, filed on Mar. 1, 2006.

(30) Foreign Application Priority Data

Mar. 1, 2006    (DE) .......................... 10 2006 009 763

(51) Int. Cl.
    *G01R 31/08* (2006.01)
(52) U.S. Cl. ........................................ 324/519; 324/664
(58) Field of Classification Search .................... 324/519
    See application file for complete search history.

(56) References Cited

U.S. PATENT DOCUMENTS

| 4,299,114 A | 11/1981 | Silvermetz et al. |
| 5,223,819 A | 6/1993 | Marsh et al. |
| 5,575,316 A * | 11/1996 | Pollklas ........................ 141/198 |
| 6,429,571 B2 * | 8/2002 | Raffalt et al. ............ 310/316.01 |
| 6,782,747 B2 * | 8/2004 | Gundlach et al. ........... 73/304 C |
| 6,997,052 B2 * | 2/2006 | Woehrle ....................... 73/290 V |
| 7,095,365 B2 * | 8/2006 | Klofer et al. ................... 342/124 |
| 7,146,845 B2 * | 12/2006 | Raffalt ............................ 73/1.83 |
| 7,412,337 B2 * | 8/2008 | Michalski et al. .............. 702/55 |
| 2004/0244481 A1 | 12/2004 | Woehrle |
| 2005/0210954 A1 | 9/2005 | Raffalt |

FOREIGN PATENT DOCUMENTS

| DE | 42 32 719 A1 | 3/1994 |
| DE | 100 23 305 A1 | 11/2001 |
| DE | 100 23 306 A1 | 12/2001 |
| DE | 100 23 306 C2 | 7/2002 |

* cited by examiner

*Primary Examiner* — Thomas Valone
(74) *Attorney, Agent, or Firm* — The Nath Law Group; Jerald L. Meyer; Robert T. Burns

(57) ABSTRACT

The subject matter relates to a circuit arrangement for monitoring the function of a fill level measuring apparatus, and particularly of a vibration level switch, including a first piezo-electric vibration device as a transmitting device, a second piezo-electric vibration device as a receiving device, an oscillator circuit, the input and output of which during normal operation are connected to the vibration devices, the second connections of which devices are at common ground potential, and a monitoring circuit for monitoring the function. The monitoring circuit has a switch element for temporarily connecting the first and second vibration devices in parallel to each other and for connecting the vibration devices, which are connected in parallel to each other, in series to a capacitance measuring apparatus during a temporary monitoring mode according to a first embodiment, a capacitance value (c) being supplied by the monitoring circuit as an indicator of the function of the vibration devices and/or of lines to the vibration devices.

8 Claims, 3 Drawing Sheets

Figure 1:
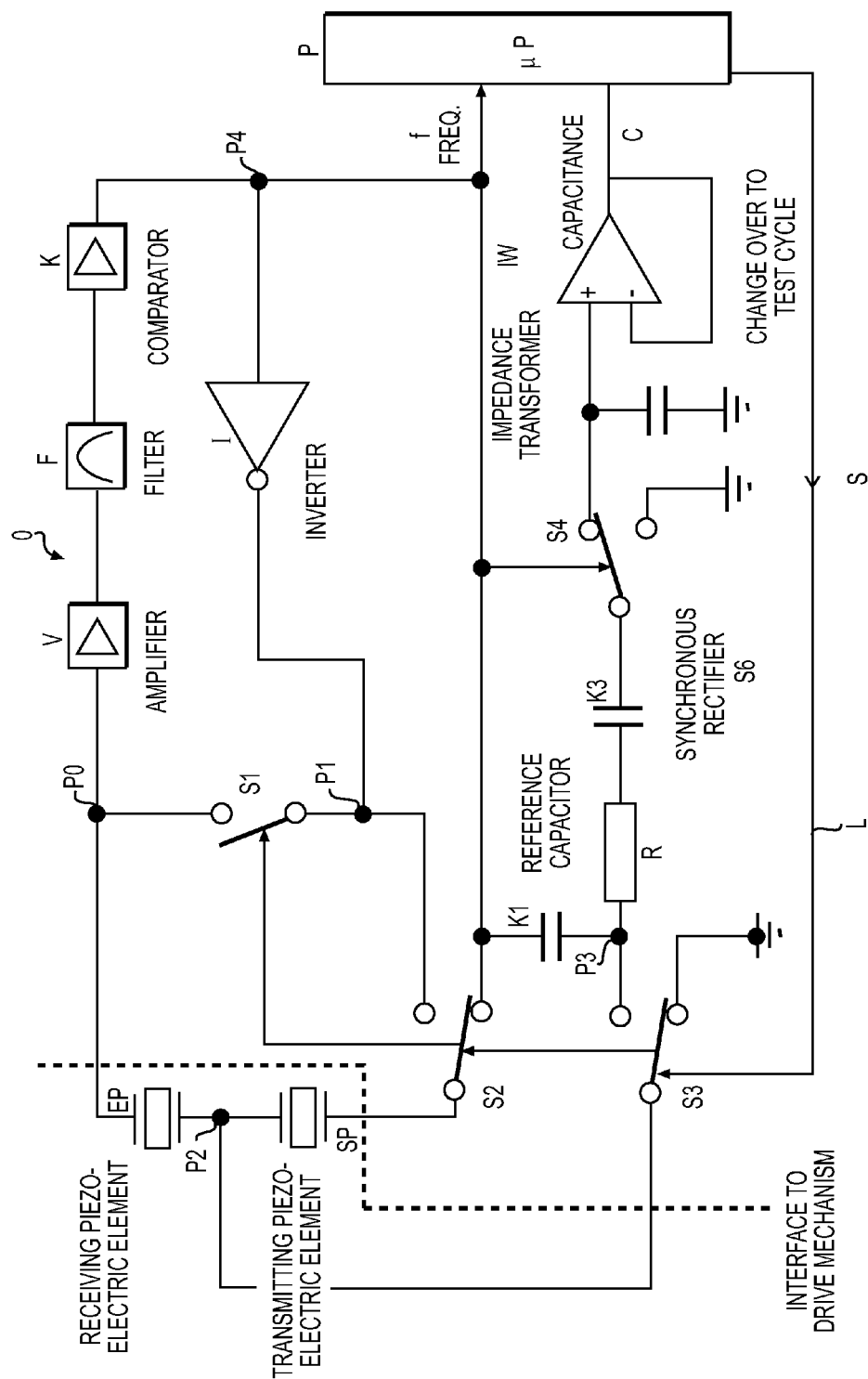

CIRCUIT ARRANGEMENT AND METHOD FOR MONITORING THE FUNCTION OF A VIBRATION LEVEL SWITCH AND/OR A FILL LEVEL MEASURING APPARAUTUS

This application is a non-provisional application of U.S. Provisional Application No. 60/777,566 filed Mar. 1, 2006, the contents of which are hereby incorporated by reference in their entirety.

The invention relates to a circuit arrangement for monitoring the function of a vibration level switch and/or a fill level measuring apparatus with the characteristics according to the preamble of claim 1 and furthermore to a method for such fill level monitoring.

Vibration level switches are typically used as switching measuring apparatuses. Piezo-electric vibration devices are used to produce and detect vibrations and/or oscillations. In general, this is associated with the problem that in the event of a defect of such a device no incorrect switching state must be reported, making monitoring of the function of such arrangements necessary.

So as to achieve a high safety integrity level in accordance with the international IEC 61508 standard in the development of fill level measuring apparatuses, the corresponding devices are subject to increased requirements in the event of a defect. Defective devices must not result in dangerous failure, so in the event of a defect the device must switch to the defect reporting state, wherein the output stage assumes a safe mode where downstream devices, such as pumps, are switched to a certain operational mode. Defects can be particularly open circuits or a short circuit of lines to the drive element, in the present case the vibration devices, a defective drive element or a component failure in an oscillator circuit.

In general, circuits of a fill level measuring apparatus or a vibration level switch are known for fill level measuring apparatuses or switching measuring apparatuses. A circuit of this type comprises a first piezo-electric vibration element as the transmitting element, a second piezo-electric vibration element as the receiving element and an oscillator circuit, the input and output of which during normal operation are connected to the vibration devices, the second connections of which are at common ground potential. A typical oscillator circuit comprises an amplifier, a filter and a comparator, which are connected in series with piezo-electric elements as the vibration devices. Via a tap, the frequency of the current oscillation is reported to an evaluation unit in the form of a processor, for example, or a downstream computer.

DE 100 23 306 C2 describes a circuit for monitoring the functioning of a circuit, wherein the piezo-electric capacitance is monitored by a single piezo-electric element and the supply leads thereof using a monitoring circuit. A corresponding method, however, can only be used with a drive mechanism having a single piezo-electric element, which is driven by a two-wire line.

For line break monitoring of a two-piezo drive with separate piezo-electric elements as the transmitting device and the receiving device, monitoring of the lines via a direct current loop is known. The direct current is monitored, which flows over ohmic resistors connected in parallel to the transmitting and receiving piezo-electric elements. In practice, attaching such monitoring elements to a piezo-electric drive is very difficult due to the typically very tight installation space and the required high temperatures. Furthermore, open circuits can only be detected up to the monitoring elements. Defects occurring directly at the drive, for example when the line contact on the piezo-electric element fails or damage occurs to the piezo-electric element itself, cannot be detected using such an arrangement.

DE 42 32 719 A1 describes a circuit and a method for monitoring an oscillator circuit in a fill level measurement device. A reference circuit is connected at regular intervals to the input of the oscillator circuit in place of the actual piezo-electric drive, meaning instead of a vibration device. As a result an oscillation is produced, which corresponds to the frequency of the covered state of a tuning fork connected to the piezo-electric element.

It is the object of the invention to propose a circuit arrangement and a method, which allow monitoring of the function of a fill level measuring apparatus, and particularly of a vibration level switch, in an alternative manner. In particular, also the function of the vibration devices is to be monitored at the same time in the case of an arrangement having separate transmitting and receiving vibration devices.

This object is achieved with a circuit arrangement having the characteristics of the independent claims.

Advantageous embodiments will be apparent from the dependent claims.

The circuit arrangements and methods are based on the basic common principle that the two piezo-electric vibration devices, which are used as transmitting device and receiving device, are connected in parallel to each other during the temporary monitoring mode, wherein this arrangement connected in parallel is then connected in series with a corresponding measuring apparatus. The measuring apparatus serves the determination of the capacitance of the two vibration devices connected in parallel, wherein two different types of capacitance measuring apparatuses are proposed. In addition, it is preferable if the oscillator circuit is introduced as a vibration source in the series connection such that the oscillator circuit oscillating at the resonance frequency excites the two piezo-electric vibration devices connected in parallel to each other during the monitoring mode.

The circuit arrangement according to the invention avoids a complex attachment of monitoring elements to the drive mechanism and/or to the vibration devices and can therefore also be used in confined installation spaces and furthermore also at the required high temperatures. Defects occurring directly at the drive mechanism can be detected, for example when the contact of a vibration device fails or when the vibration device as such becomes damaged.

According to a first embodiment, it is preferable to use a circuit arrangement for monitoring the function of a fill level measuring apparatus, and particularly of a vibration level switch, comprising a first piezo-electric vibration device as the transmitting device, a second piezo-electric vibration device as the receiving device, an oscillator circuit, the input and output of which during normal operation are connected to the vibration devices, the other connections of which devices being at common ground potential, and a monitoring circuit for monitoring the function, wherein the monitoring circuit has a switch element for temporarily connecting the first and second vibration devices in parallel and for connecting the vibration devices, which are connected in parallel to each other, in series to a capacitance measuring apparatus during a temporary monitoring mode, wherein a capacitance value is provided by the monitoring circuit as an indicator of the function of the vibration devices and/or of lines to the vibration devices.

The monitoring circuit preferably has a third switch element for switching the vibration devices optionally to ground or to a reference capacitor of the capacitance measuring apparatus.

It is preferable if the monitoring circuit has an oscillator circuit switch element for applying an oscillation with defined frequency, particularly a resonant frequency of the oscillator circuit, to a first connection of the capacitance measuring apparatus, particularly to the reference capacitor, and at the same for applying the inverted oscillation of the oscillator circuit to a connection of the vibration devices connected in parallel, so that a series connection closed in the circuit is created from the oscillator circuit with an inverter, the vibration devices connected in parallel to each other and the reference capacitor of the capacitance measuring apparatus.

A synchronous rectifier is preferably used to convert an alternating current of the capacitance measuring apparatus to a direct current, the voltage level of which depends on the overall capacitance of the vibration devices and the interface thereof on the one hand, and the capacitance of the reference capacitor on the other hand. The output direct current of the synchronous rectifier is independent of the current frequency of the oscillator circuit.

According to a second embodiment, it is preferable to use a circuit arrangement for monitoring the function of a vibration level switch and/or a fill level measuring apparatus, comprising a first piezo-electric vibration device as the transmitting device, a second piezo-electric vibration device as the receiving device, an oscillator circuit, the input and output of which during normal operation are connected to the vibration devices, the second connections of which devices are at common ground potential, and a monitoring circuit for monitoring the function, wherein the monitoring circuit has a switch element for temporarily connecting the first and second vibration devices in parallel and for connecting the vibration devices, which are connected in parallel to each other, in series to a charge reversal current measuring apparatus for tapping a charge reversal current of the vibration devices during a temporary monitoring mode, wherein a capacitance value is provided by the monitoring circuit as an indicator of the function of the vibration devices and/or of lines to the vibration devices.

The charge-reversal current measuring apparatus preferably comprises a low-pass filter for flattening the charge-reversal current tapped from the vibration devices.

The monitoring circuit preferably has a third switch element for switching the vibration devices optionally to ground or to a resistor of the charge-reversal current measuring apparatus.

Such monitoring circuits preferably have an oscillator circuit switch element for applying a resonant frequency, particularly for applying an inverted resonant frequency of the oscillator circuit to the vibration devices, which are connected in parallel to each other during the monitoring mode.

In a further embodiment, instead of an oscillator circuit voltage from the oscillator circuit a test voltage from a voltage generator may be applied during the monitoring mode to the vibration devices connected in parallel to each other.

According to a separate advantageous embodiment, it is also preferable to use a circuit arrangement for monitoring the function of a fill level measuring apparatus, comprising a first piezo-electric vibration device as a transmitting device, a second piezo-electric vibration device as a receiving device, an oscillator circuit, the input and output of which during normal operation are connected to the vibration devices, the second connections of which devices are placed at common ground potential, and a monitoring circuit for monitoring the function, wherein the monitoring circuit has an oscillator circuit switch element for temporarily connecting the input and output of the oscillator circuit for a monitoring mode to monitor the function, so that the oscillator circuit oscillates at a defined frequency, wherein the defined frequency is provided as an indicator for the function of the oscillator circuit. The defined frequency is advantageously the current resonant frequency of the oscillator circuit, wherein the defined frequency may be compared to a reference value using a comparator device.

According to a first embodiment, a method for monitoring the function of a fill level measuring apparatus, and particularly of a vibration level switch, is preferred wherein during normal operation a first piezo-electric vibration device as a transmitting device and a second piezo-electric vibration device as a receiving device are connected to the input and the output of an oscillator circuit and wherein for monitoring the function in a monitoring mode a monitoring circuit is activated, wherein during the monitoring mode the two vibration devices are connected in parallel to each other and the vibration devices, which are connected in parallel to each other, are connected in series to a capacitance measuring apparatus in order to provide a capacitance value as an indicator of the function of the vibration devices, and wherein an oscillation of a vibration source is connected in series at a defined frequency, particularly a resonant frequency of the oscillator circuit, to the vibration devices, which are connected in parallel to each other, and to a reference capacitor of the capacitance measuring apparatus.

According to a second embodiment, a method for monitoring the function of a fill level measuring apparatus, and particularly of a vibration level switch, is preferred wherein during normal operation a first piezo-electric vibration device as a transmitting device and a second piezo-electric vibration device as a receiving device are connected to the input and the output of an oscillator circuit and wherein for monitoring the function in a monitoring mode a monitoring circuit is activated, wherein during the monitoring mode the two vibration devices are connected in parallel to each other and the vibration devices, which are connected in parallel to each other, are connected in series to a charge-reversal current measuring apparatus in order to tap a charge-reversal current of the measuring apparatus and to provide a capacitance value as an indicator of the function of the vibration devices, and wherein an oscillation of a vibration source is connected in series at a defined frequency, particularly a resonant frequency of the oscillator circuit, to the vibration devices, which are connected in parallel to each other, and to a resistor of the charge-reversal current measuring apparatus.

Advantageous are such methods wherein instead of an oscillator voltage from the oscillator circuit a test voltage from a voltage generator is applied to the vibration devices connected in parallel to each other during the monitoring mode.

Advantageous are such methods wherein the oscillator circuit has a detunable filter and the oscillator circuit is tuned to the tuning fork connected to the vibration devices by means of a processor in the monitoring mode by adjusting the filter.

During a temporary monitoring mode and/or test cycle, thus the input and output of the oscillator circuit are connected to each other, causing the oscillator to oscillate at the resonant frequency. This frequency provides information about the function of the oscillator circuit. Furthermore, during the monitoring mode a parallel connection of the two piezo-electric vibration devices is switched for transmitting and receiving functions and the entire capacitance is measured. The entire capacitance shall be understood as the capacitance values of the two piezo-electric vibration devices and the lines thereto. The capacitance value provides information about the function of the drive mechanism formed by the vibration devices.

Figure 2:
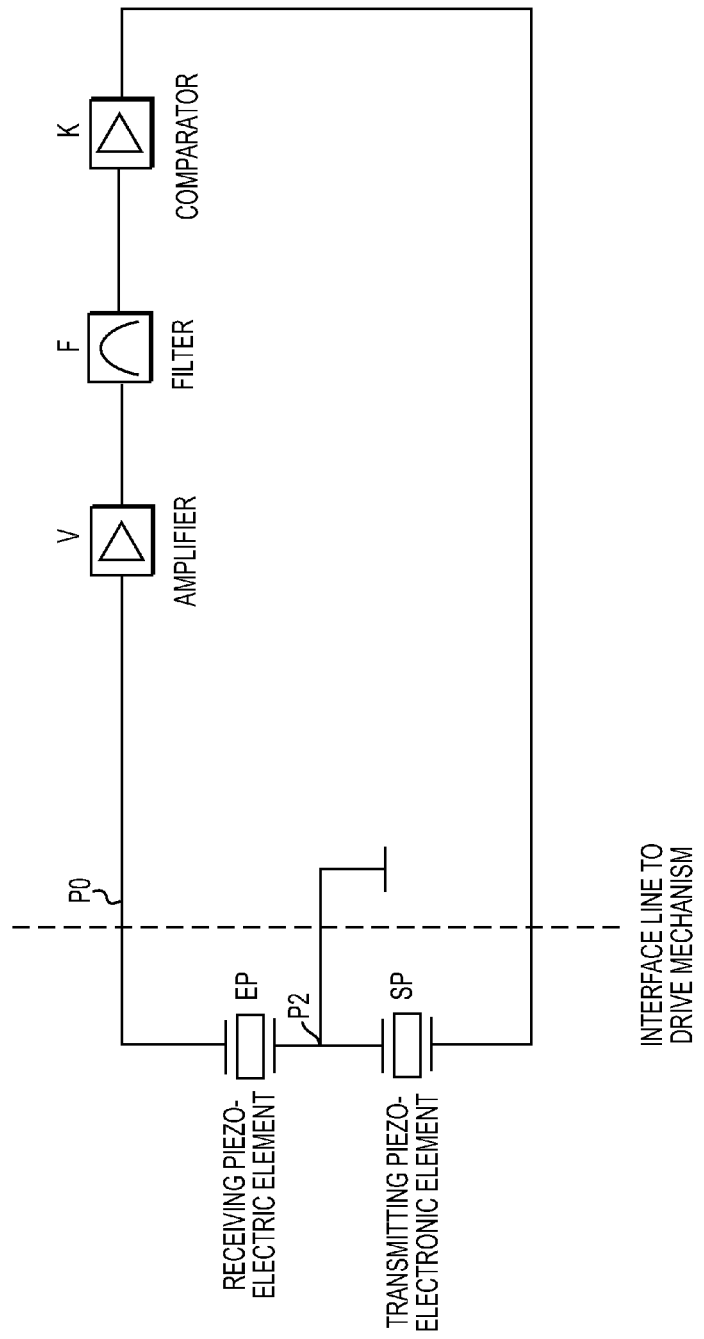
Figure 3:
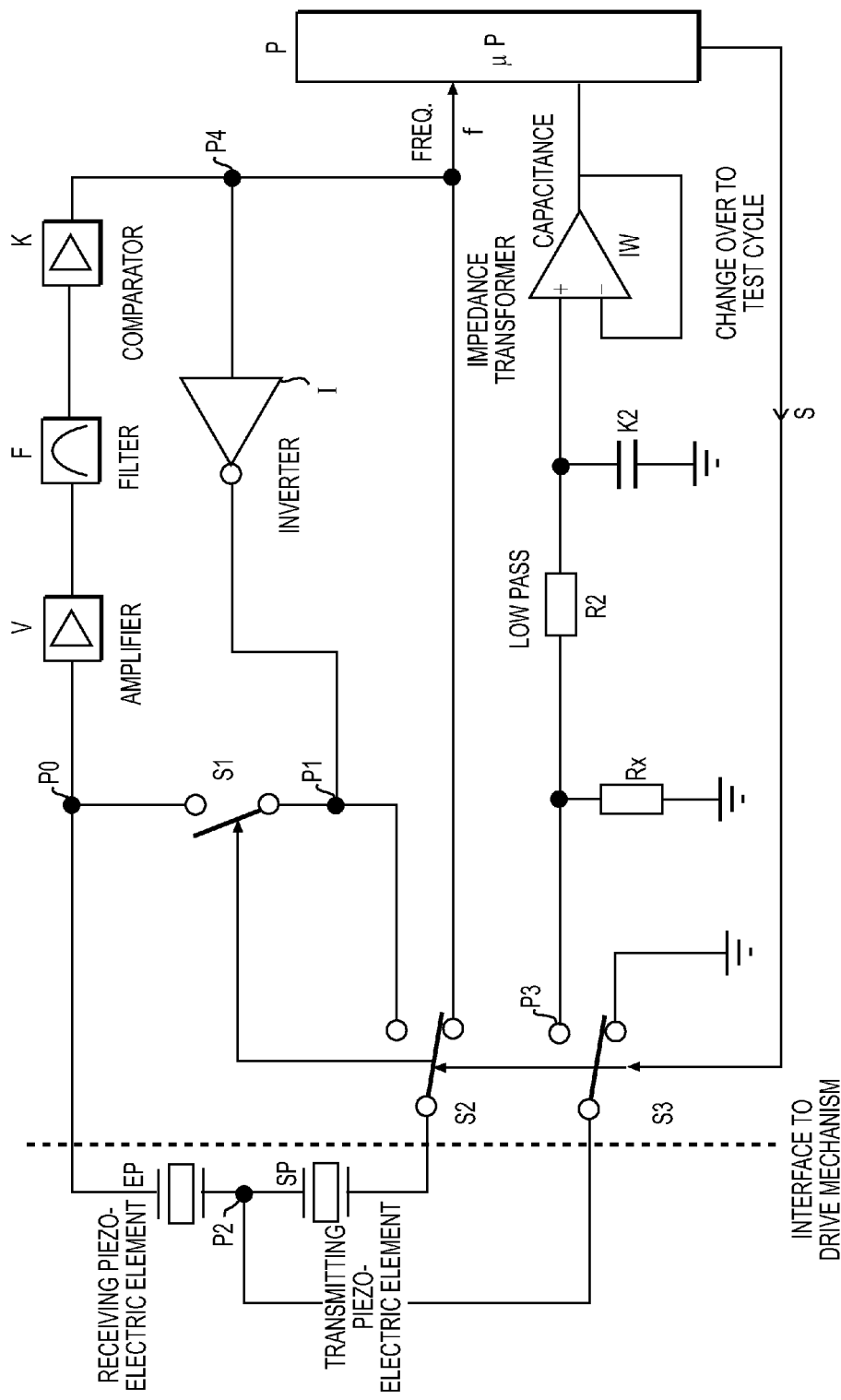

Examples of the embodiments of the invention will be described in detail hereinafter with references to the figures, wherein:

FIG. 1 is a first exemplary circuit arrangement of a vibration level switch comprising a first monitoring circuit for monitoring the function of two piezo-electric vibration devices with three switches S1, S2 and S3, FIG. 2 is the circuit arrangement according to FIG. 1 during normal operation in a simplified illustration, the switches S1, S2 and S3 being assumed in the positions shown in FIG. 1, FIG. 3 is a second exemplary circuit arrangement for monitoring the function with an alternative monitoring circuit to FIG. 1.

FIG. 1 shows, by way of example, a circuit arrangement for monitoring the function of a vibration level switch, wherein the basic principle of the monitoring circuits described based on the embodiments can also be applied to a fill level measuring apparatus.

An oscillator circuit O is formed in the conventional manner by an amplifier V, a filter F and a comparator K, which are connected in series. At the beginning and/or at the end of the series connection, a corresponding input P0 and/or output P4 of the oscillator circuit O are formed. First and second vibration devices SP and EP are connected as piezo-electric elements to the output P4 and the input P0 of the oscillator circuit O, as is illustrated according to FIG. 2 for the normal measuring mode. The other connections of the two vibration devices SP, EP are located on a common second point P2, which is connected to ground during normal operation.

A monitoring circuit according to FIG. 1 is formed by a plurality of components as well as switch and monitoring processes, which are temporarily activated during a monitoring operation and/or test cycle. The circuit arrangement comprises three switches S1, S2 and S3, which are preferably switched jointly by means of a switch signal s that can be applied via a control line L in order to switch the arrangement either into normal mode or the monitoring mode. FIG. 1 shows the switches S1, S2 and S3 in the positions they assume in normal mode. FIG. 2 shows the simplified circuit diagram.

Between the output P4 and the input P0 of the oscillator circuit O, an inverter I and the first switch S1 are connected as an oscillator circuit switch element. In the monitoring mode, the input P0 and the output P4 of the oscillator circuit O are connected to each other by means of the first switch S1 and the inverter I. As a result of this feedback, the oscillator formed by the oscillator circuit O oscillates at the resonant frequency as a defined frequency f.

This defined frequency f is detected, for example, at the output P4 of the oscillator circuit O and fed, for example, to a processor P. A frequency value of the frequency f is supplied as an indicator of the function of the oscillator circuit. The processor P compares this frequency f to a stored reference value. If the frequency f deviates too much from the reference value, an error exists in the oscillator circuit O, prompting the processor P to move the sensor or vibration level switch to a malfunction mode.

The second switch S2 is connected between the piezo-electric vibration device SP on the one hand and the output P4 of the oscillator circuit O on the other hand. In the monitoring mode, the second switch S2 is switched and forms a connection between the vibration device SP and a first point P1, which is connected between the first switch S1 and the inverter I. From the point of view of the second point P2 or tap, which is located between the two vibration devices SP, EP, and the output P4 of the oscillator circuit O and/or of the inverter I, effectively a parallel connection of the two vibration devices SP, EP is formed. Ultimately, in the monitoring mode the transmitting piezo-electric element is connected in parallel to the receiving piezo-electric element using the switch S2.

The third switch S3 is connected between the second point P2 and/or tap between the two vibration devices SP, EP on the one hand and ground on the other hand. In the monitoring mode, the third switch S3 disconnects the two vibration devices SP, EP from ground and connects the two vibration devices SP, EP to a capacitance measuring apparatus, which is used to monitor the function of the vibration devices SP, EP.

The three switches S1-S3 thus form a switch element, which switches between normal mode and the monitoring mode. The switches may be configured in the conventional manner as mechanical circuit elements or as electronic circuit elements, such as transistors for example.

In the monitoring mode, the third switch S3 connects the tap and/or second point P2 between the vibration devices SP, EP to a third point P3. A reference capacitor K1 is connected between the third point P3 and the output P4 of the oscillator circuit O. In the monitoring mode, the third point P3 and hence the reference capacitor K1 are connected in series to the vibration devices SP, EP, which are connected in parallel to each other. According to the most preferred embodiment, this series connection is selected with the signal of the resonant oscillation, meaning the defined frequency f of the oscillator circuit O, on the one hand and with the inverted signal of the resonant oscillation of the inverter I on the other hand. This way, the capacitance of the vibration devices SP, EP, meaning the drive element of the vibration level switch, and the line capacitance are compared to the reference capacitor K1. At the third point P3 between the piezo-electric elements and/or vibration devices SP, EP connected in parallel and the reference capacitor K1 square wave voltage rs is produced, the amplitude of which is dependent on the ratio of the capacitance of the vibration devices and the lines thereto on the one hand and the reference capacitance of the reference capacitor K1 on the other hand.

With the help of a synchronous rectifier SG, this square wave voltage rs is turned into a direct current, which is not dependent on the frequency f and in the case of a constant reference capacitor is only dependent on the overall capacitance of the vibration devices SP, EP and the interface. This direct current therefore represents a capacitance value c, which the processor P can analyze as an indicator of the function of the vibration devices SP, EP and the interface thereof. Accordingly, the direct current of the synchronous rectifier SG is applied to the processor P. From the point of view of the third point P3, the synchronous rectifier SG is formed by an arrangement that preferably comprises a resistor R, a capacitor K3, a fourth switch S4, an impedance transformer IW and a further capacitor K2, which is connected between the fourth switch S4 and the positive input of the impedance transformer IW on the one hand and ground on the other hand. The fourth switch S4 switches the resistor R connected in series and the capacitor K3 as a function of the voltage present at the output P4 of the oscillator circuit O between the impedance transformer IW and ground.

The voltage of the monitoring circuit and/or the capacitance value c are provided at an output for a higher-ranking device or are applied to an integrated processor, such as the processor P shown by way of example. The processor P compares the capacitance value c to a target value in order to determine the state of the drive device and/or the vibration devices SP, EP and/or the interface thereof. If the capacitance of the capacitance value c is lower than the target value, a line break or a defect of the vibration devices exists. An increase in the measured capacitance, meaning a capacitance value c that is higher than the target value, indicates an increase in the ambient temperature of the vibration devices, meaning the temperature to which the piezo-electric material is exposed. A severe increase up to the supply voltage indicates a short-circuit of the piezo-electric vibration devices SP, EP.

According to a separate advantageous embodiment, by closing the first switch S1 the feedback can be used to align the oscillator switch and/or the oscillator circuit O with a turning fork, which is connected to the piezo-electric vibration devices SP, EP for the transmission of oscillations. For such an application, a detunable filter is used as the filter F in the oscillator circuit O, so that the resonant frequency of the oscillator circuit O can be set as is required for the corresponding frequency of the fork. If such a connection is described using a function and stored in the processor P or made available to the processor, such an alignment process can be automated using the processor P by automatically setting the filter F accordingly.

FIG. 3 shows a further embodiment comprising a modified monitoring circuit, wherein the monitoring circuit comprises a charge-reversal current measuring apparatus for tapping a charge-reversal current of the vibration devices SP, EP. For simplification, reference is made to the corresponding description of FIG. 1 insofar as the components and the functionality thereof are shown in FIG. 3. This relates in particular to the identical set-up of the oscillator circuit O comprising the amplifier V, the filter F and the comparator K, which are connected between an input P0 and an output P4. Similar to FIG. 1, an inverter I and a first switch S1 are connected between the input P0 and output P4 of the oscillator circuit O. Furthermore, similarly two vibration devices EP, SP and a second switch S2 are connected to the input P0 of the oscillator circuit O and the output P4 thereof. Furthermore, a third switch S3 is connected to the other lead of the two vibration devices SP, EP on the one hand and optionally either to ground or to the monitoring circuit in the form of a charge-reversal current measuring apparatus on the other hand. A switch signal s, which is provided by the processor P, is again used for the preferred simultaneous switching of the three switches S1-S3. In the circuit arrangement according to FIG. 1, a defined frequency F in the form of the resonant frequency of the oscillator circuit O in the case of the monitoring mode and a capacitance value c of the monitoring circuit are applied to the processor P.

Starting from a third point P3, which in the monitoring mode is switched by the third switch S3, the charge-reversal current measuring apparatus comprises, in series, a resistor R2 and an impedance transformer IW, as in the case of the arrangement according to FIG. 1. A capacitor K2 is connected between the resistor R2 and the impedance transformer IW on the one hand and ground on the other hand, with the resistor R2 and the capacitor K2 forming a low pass.

Furthermore, between the third point P3 and the resistor R2 on the one hand and ground on the other hand a further resistor Rx is connected, the third point P3 supplying a charge-reversal current in relation to ground between this further resistor Rx and the two vibration devices SP, EP. The charge-reversal current, which can be tapped at the further resistor Rx connected in series to the vibration devices SP, EP, which are connected in parallel to each other, is proportional to the charge reversal. The charge-reversal current is flattened with the low pass and applied to the impedance transformer IW to provide the capacitance value c.

The capacitance value c supplied by means of such a circuit corresponds to a voltage value, which value, however, is not only dependent on the capacitance of the piezo-electric vibration devices, but also on the measuring frequency, which corresponds to the resonant frequency of the feedback oscillator circuit O. Due to the limited application fields compared to FIG. 1 therefore the embodiment according to FIG. 1 is particularly preferred.

The two embodiments according to FIG. 1 and FIG. 3 may be modified further in that in place of applying the resonant frequency and/or defined frequency f of the oscillator circuit O a separate voltage and/or oscillation is applied to the vibration devices SP, EP connected in parallel to each other for capacitance measurement. In this case, such voltage or oscillation would be fed by a separate generator or directly from the processor P. While this would increase the complexity of the circuit, it could still be implemented advantageously. It is preferable if a further switch were provided for coupling the separate voltage and/or electric oscillation, which switch uncouples the first point P1 and/or the output P4 of the oscillator circuit O from the two vibration devices for the monitoring mode and couples the two vibration devices to the separate voltage in the monitoring mode.

The invention claimed is:

1. A circuit arrangement for monitoring the function of a fill level measuring apparatus, comprising:
 a first piezo-electric vibration device as a transmitting device;
 a second piezo-electric vibration device as a receiving device;
 an oscillator circuit having an input and output respectively connected to the first and second piezo-electric vibration devices;
 first, second, and third switches;
 a first connecting line connecting a first connection of the second piezo-electric device to the first switch;
 a second connecting line connecting a second connection of the second piezo-electric device to the third switch;
 a third connecting line connecting a first connection of the first piezo-electric device to the second switch; and
 a monitoring circuit, wherein:
 the first and second switches connect the first and second piezo-electric vibration devices in parallel and the third switch disconnects from ground and connects the first and second piezo-electric vibration devices to a capacitance measuring apparatus during a temporary monitoring mode,
 a capacitance value (c) is supplied by the monitoring circuit as an indicator of the function of the first and second piezo-electric vibration devices and/or of at least one of the first, second, and third connecting lines.

2. The circuit arrangement according to claim 1, wherein the third switch optionally connects the first and second piezo-electric vibration devices to ground or to a reference capacitor of the capacitance measuring apparatus.

3. A circuit arrangement according to claim 1, wherein an oscillation at defined frequency (f) from the oscillator circuit is inputted to a first connection of the capacitance measuring apparatus, particularly to a reference capacitor, and an inverted oscillation from the oscillator circuit is inputted to at least one connection of the first and second piezo-electric vibration devices.

4. A circuit arrangement according to claim 1, further comprising:
 a synchronous rectifier for converting an alternating current (rs) of the capacitance measuring apparatus to a direct current, the voltage level of which depends on the overall capacitance of the first and second piezo-electric vibration devices and at least one of the first second, and third connecting lines thereof, and a capacitance of the reference capacitor.

5. The circuit arrangement according to claim 4, wherein the voltage level of the direct current of the synchronous rectifier is independent of the frequency (f) of the oscillator circuit.

6. A method for monitoring the function of a fill level measuring apparatus, comprising:
   providing a first piezo-electric vibration device as a transmitting device;
   providing a second piezo-electric vibration device as a receiving device;
   connecting the first and second piezo-electric vibration devices to an input and an output of an oscillator circuit, respectively;
   connecting a first line to a first connection of the second piezo-electric device and a first switch;
   connecting a second line to a second connection of the second piezo-electric device and a second switch;
   connecting a third line to a first connection of the first piezo-electric device and third switch;
   connecting the first and second piezo-electric vibration devices in parallel via the first and third switches; and
   connecting the first and second piezo-electric vibration devices to a capacitance measuring apparatus via the second switch; and
   supplying a capacitance value (c) from a monitoring circuit as an indicator of a function of the first and second piezo-electric vibration devices and/or at least one of the first, second, and third connecting lines, wherein the third switch disconnects from ground and connects the first and second piezo-electric vibration devices to the capacitance measuring apparatus during a temporary monitoring mode.

7. The method according to claim 6, wherein for the monitoring mode instead of an oscillator circuit voltage from the oscillator circuit a test voltage from a voltage generator is applied to the vibration devices connected in parallel to each other.

8. The method according to claim 6, wherein the oscillator circuit has a detunable filter and in the monitoring mode by means of a processor the oscillator circuit is tuned to a tuning fork connected to the vibration devices by adjusting the filter.

* * * * *

UNITED STATES PATENT AND TRADEMARK OFFICE
CERTIFICATE OF CORRECTION

PATENT NO. : 7,994,796 B2
APPLICATION NO. : 11/698019
DATED : August 9, 2011
INVENTOR(S) : Siegbert Woehrle It is certified that error appears in the above-identified patent and that said Letters Patent is hereby corrected as shown below:

Please delete the following on the Title page of the patent:

Item "(54) CIRCUIT ARRANGEMENT AND METHOD FOR MONITORING THE FUNCTION OF A VIBRATION LEVEL SWITCH AND/OR A FILL LEVEL MEASURING APPARAUTUS"

replace with the following on the Title page of the patent:

Item -- (54) CIRCUIT ARRANGEMENT AND METHOD FOR MONITORING THE FUNCTION OF A VIBRATION LEVEL SWITCH AND/OR A FILL LEVEL MEASURING APPARATUS --

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,994,796 B2 | Page 1 of 1 |
| APPLICATION NO. | : 11/698019 | |
| DATED | : August 9, 2011 | |
| INVENTOR(S) | : Siegbert Woehrle | |

It is certified that error appears in the above-identified patent and that said Letters Patent is hereby corrected as shown below:

Title Page, Item (54) and at Column 1, lines 1-4, title,

"CIRCUIT ARRANGEMENT AND METHOD FOR MONITORING THE FUNCTION OF A VIBRATION LEVEL SWITCH AND/OR A FILL LEVEL MEASURING APPARAUTUS"

should be replaced with the following

-- CIRCUIT ARRANGEMENT AND METHOD FOR MONITORING THE FUNCTION OF A VIBRATION LEVEL SWITCH AND/OR A FILL LEVEL MEASURING APPARATUS --

This certificate supersedes the Certificate of Correction issued October 11, 2011.

Signed and Sealed this
Eighth Day of November, 2011

David J. Kappos
*Director of the United States Patent and Trademark Office*